E. Dougherty,
Tenoning Spokes and Boring Fellies,
N° 25,727. Patented Oct. 11, 1859.
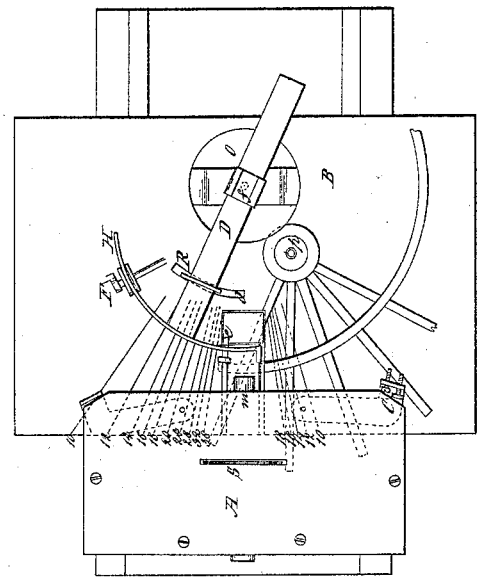
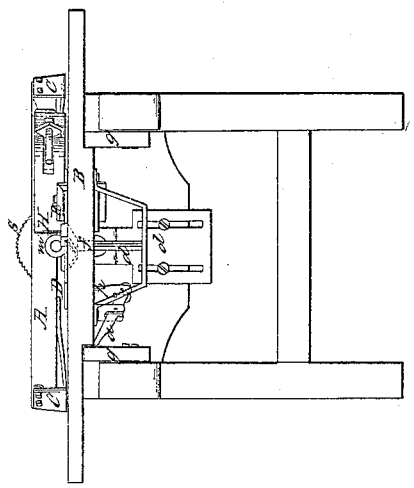
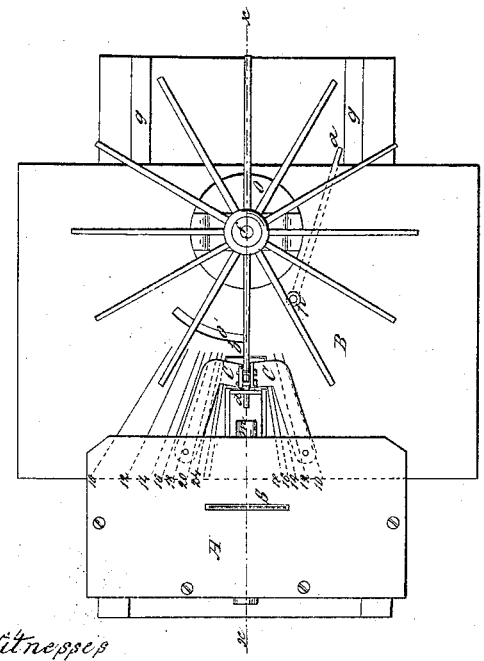
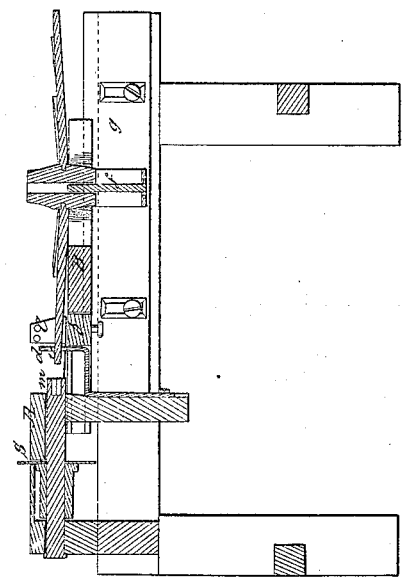
Witnesses
Samuel G. Barber
James H. Vanburen
Inventor
E. Dougherty

UNITED STATES PATENT OFFICE.

E. DOUGHERTY, OF CEDARVILLE, OHIO.

WHEELWRIGHT-MACHINE.

Specification of Letters Patent No. 25,727, dated October 11, 1859.

*To all whom it may concern:*

Be it known that I, E. DOUGHERTY, of Cedarville, in the county of Greene and State of Ohio, have invented a new and useful Improvement in Wheelwrights' Machinery; and I do hereby declare that the following is a full, clear, and exact description of the same, reference being had to the annexed drawing, forming part of this specification, in the several figures of which similar characters of reference denote the same part.

Figure 1, is a top view of my improvement with the wheel adjusted for tenoning the spokes. Fig. 2 is a vertical section on line $x, x$. Fig. 3 is a plan view showing the arrangement for boring the fellies, and sawing off the spokes, the latter being in red ink. Fig. 4 is an end view of the machine in position for boring fellies.

The nature of the invention consists in a certain combination of devices by which the spokes are sawed of equal lengths, the tenons are made at equal distances from the hub, and the fellies bored at regular distances so as to fit on the spokes, the details of construction and operation being as follows.

In the drawing A, is an elevated table having under it a mandrel for turning the circular saw S, and an opening in the top through which the saw runs, in the end of mandrel $m$, are adjusted the bits or augers for tenoning the spokes and boring the fellies. B, is a sliding table on slotted guides $g, g$, by which it can be raised or lowered, near the center of this table is a small opening through which a pivot $p$, worked by a lever $a$, under the table, is raised and lowered, on this pivot the hub of the wheel is placed with the spokes extending forward to the saw, so as to be cut by it of equal lengths.

O, is an opening in sliding table B, in the center of which is a pivot $f$, on which the wheel is placed during the tenoning process.

$b$, is an adjustable slide in table B, regulating its distance from the mandrel to suit the length of the spoke.

$d$, is a stop against which the slide $b$, rests when the sliding table is pushed up, this stop is also vertically adjustable and having an opening $i$, serves as a guide for the spoke while being tenoned.

C, C, are also adjustable guides for holding the spoke in position during the tenoning.

D, is a plate having around it a band which fits on pivot $f$ and a loose ring R, which is inserted in opening O', so as to keep it in place on the table. At the end of said plate D, is an arched rim H, having a flange on the end and a screw $e$ against which the felly rests when in position for boring, and also a crank screw F, movable in a slot, by which the boring of the felly is regulated as will be hereafter set forth. There is also on the table B, a scale marked with numbers in the drawing, by which in combination with the crank screw F, the distances of boring the fellies are regulated in accordance with the number of spokes.

In sawing the spokes, the pivot $p$, having been raised by lever $a$, the hub is placed on it and the spokes extending forward to saw S, are by its revolution cut of equal lengths, the length of the spoke being controlled by moving the sliding table B. The pivot $p$, is then lowered, and the hub placed on pivot $f$, in opening $o$, and the spokes guided by bringing together guides C, and moving up stop $d$, so that the spoke will pass through its opening $i$, the slide $b$, is then adjusted to suit the length of spoke and the table B, moved up, and the proper bit being inserted in the mandrel, the tenon is made, the next spoke is then brought around and so with them all, thus making the tenons all at equal distances from the hub. The wheel is then removed from the pivot $f$, and the plate D, placed on it, with its ring R, in the opening $o'$, of table B, and the guides C, moved out of the way, so as to allow the fellies to be bored. The felly is then placed against the flange and screw $e$, on rim H; and for boring the first hole, if there are 12 spokes in the wheel the end of the felly is placed at line 24, which is half the distance from the line 12, at which the point of the crank screw F, is placed, to the bit, and the table being moved up the hole is bored by the bit. This hole is then placed on the point of the crank screw at line 12, which will make the next hole at the proper distance and so on the whole length of felly, when the last hole is made the end of the felly must be sawed off at the line 12, on left side of the table, which will be half the distance from where the next hole ought to be. The crank screw is always placed at the line on the right hand corresponding to the number of spokes.

The table B, can be raised or lowered by the guides g, g, being slotted, to suit the width of the felly. By these means the holes may be bored in any length of felly, at regular distances from each other, and can be varied to suit any number of spokes, by changing the point of crank screw F, to the corresponding line on the scale and proceeding in the same way as above described.

If desired the plate D, may be attached to the slide b, and both be moved up together by means of a screw under the table.

Having thus described my invention and its operation I claim—

The combination of devices, as herein specified substantially as, and for the purposes set forth.

In testimony whereof I have hereunto signed my name before two subscribing witnesses.

E. DOUGHERTY.

Witnesses:
SAMUEL G. BARBER,
JAMES R. VANHORN.